US006470146B1

United States Patent
Sangregory

(10) Patent No.: US 6,470,146 B1
(45) Date of Patent: Oct. 22, 2002

(54) ONE-TIME-USE CAMERA WITH ACCESSORY BELT CLIP CONNECTED TO FILM DOOR AND THAT AVOIDS BEING BROKEN WHEN FILM DOOR BROKEN OPEN TO REMOVE FILM CARTRIDGE

(75) Inventor: Jude A. Sangregory, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 1 day.

(21) Appl. No.: 09/832,757

(22) Filed: Apr. 11, 2001

(51) Int. Cl.7 .......................... G03B 17/02; G03B 17/00
(52) U.S. Cl. .......................... 396/6; 396/424; 396/536
(58) Field of Search .......................... 396/6, 423, 424, 396/535, 541, 544, 536; 224/242, 255, 269, 270, 908

(56) References Cited

U.S. PATENT DOCUMENTS

| D254,790 S | 4/1980 | Waaske | D16/208 |
|---|---|---|---|
| 4,828,153 A | 5/1989 | Guzik et al. | 224/242 |
| 5,250,973 A | 10/1993 | Pijlman | 396/535 |
| 5,361,459 A | 11/1994 | Hyvonen et al. | 24/35 |
| 5,711,424 A | 1/1998 | Kiesow | 206/316.2 |
| 5,927,579 A | 7/1999 | Schwabe | 224/269 |
| 6,097,890 A | 8/2000 | Horning et al. | 396/6 |
| 6,134,388 A | 10/2000 | Balling et al. | 396/6 |

Primary Examiner—David M. Gray
Assistant Examiner—Rochelle Blackman
(74) Attorney, Agent, or Firm—Roger A. Fields

(57) ABSTRACT

A one-time-use camera includes a rear cover part that has an integral door cover portion and an integral remaining cover portion, that is weakened between the door and remaining cover portions to allow the door cover portion to be pivoted open relative to the remaining cover portion to permit a film cartridge to be removed from the camera, and that has a carrystrap post on the door cover portion. An accessory belt clip has a plurality of co-acting fingers which are spaced apart less than a thickness of the carrystrap post and are resiliently flexible away from one another to be able to engage the carrystrap post to releasably grip the canrystrap post. The belt clip that rests against the remaining cover portion when the co-acting fingers releasably grip the carrystrap post. Thus, as the door cover portion is pivoted open the carrystrap post will rotate within the grip of the co-acting fingers and simultaneously the accessory belt clip will slide along the remaining cover portion to avoid breaking the accessory belt clip.

9 Claims, 6 Drawing Sheets

ONE-TIME-USE CAMERA WITH ACCESSORY BELT CLIP CONNECTED TO FILM DOOR AND THAT AVOIDS BEING BROKEN WHEN FILM DOOR BROKEN OPEN TO REMOVE FILM CARTRIDGE

FIELD OF THE INVENTION

The invention relates generally to the field of photography, and in particular to cameras and accessory belt clips. More specifically, the invention relates to a one-time-use camera with an accessory belt clip connected to a film door and that avoids being broken when the film door is broken open to remove a film cartridge from the camera.

BACKGROUND OF THE INVENTION

Film and cameras that are all in one, commonly referred to as disposable single-use or one-time-use cameras, have become well known. The one-time-use camera is a simple point-and-shoot type camera comprising a conventional film cartridge within a cartridge receiving chamber in a main body part, an unexposed film roll prewound from the film cartridge onto a film supply spool within a film supply chamber in the main body part, a film-exposing backframe opening between the cartridge receiving and film supply chambers in the main body part, a fixed-focus taking lens, a film metering mechanism with a rotatably supported metering sprocket that has respective sprocket teeth for engaging the filmstrip at successive film perforations, a manually rotatable film winding thumbwheel coaxially engaged with a film winding spool inside the film cartridge, a single-blade shutter, a manually depressible shutter release button, an exposure counter wheel that has a numerical series of evenly spaced exposure count indicia and is incrementally rotated to successively view the exposure count indicia, an anti-backup pawl that engages the exposure counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film winding spool inside the film cartridge. This winds an exposed frame of the filmstrip from the backframe opening into the film cartridge and advances an unexposed frame of the filmstrip from the unexposed film roll to the backframe opening. The rewinding movement of the filmstrip the equivalent of slightly more than one frame width rotates the metering sprocket in engagement with the filmstrip to decrement the exposure counter wheel to its next lower-numbered indicia and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer. An example of the break-away feature of the rear cover part is disclosed in U.S. patent Ser. No. 6,097,890 issued Aug. 1, 2000, which is incorporated in this application.

Problem

Rather than carry the one-time-use camera in one's pocket, one may use a belt clip or the like to hang the camera on one's belt or shirt pocket. If the belt clip remains attached to the camera when the camera is given to a photofinisher, the belt clip may be broken when the photofinisher breaks away the cover door portion of the rear cover part from the main body part to remove the film cartridge from the camera. Since the belt clip can be reused, it is preferable not to break it when the cover door portion is broken open.

SUMMARY OF THE INVENTION

According to one aspect of the invention, a one-time-use camera comprises:

a rear cover part that has an integral door cover portion and an integral remaining cover portion, that is weakened between the door and remaining cover portions to allow the door cover portion to be pivoted open relative to the remaining cover portion to permit a film cartridge to be removed from the camera, and that has a carrystrap post on the door cover portion; and an accessory belt clip that has a plurality of co-acting fingers which are spaced apart less than a thickness of the carrystrap post and are resiliently flexible away from one another to be able to engage the carrystrap post to releasably grip the carrystrap post, and that rests against the remaining cover portion when the co-acting fingers releasably grip the carrystrap post, in order that when the door cover portion is pivoted open the carrystrap post will rotate within the grip of the co-acting fingers and simultaneously the accessory belt clip will slide along the remaining cover portion to avoid breaking the accessory belt clip.

According to another aspect of the invention, a method of opening a camera to remove a film cartridge from the camera comprises:

pivoting a door cover portion of a rear cover part relative to a remaining cover portion of the rear cover part to swing the door cover portion open to permit the film cartridge to be removed; and rotating a carrystrap post, on the door cover portion, within an end-grip of an accessory belt clip, attached to the cover door portion at the carrystrap post, as the door cover portion is pivoted open, in order to avoid breaking the accessory belt clip.

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Figure 1:
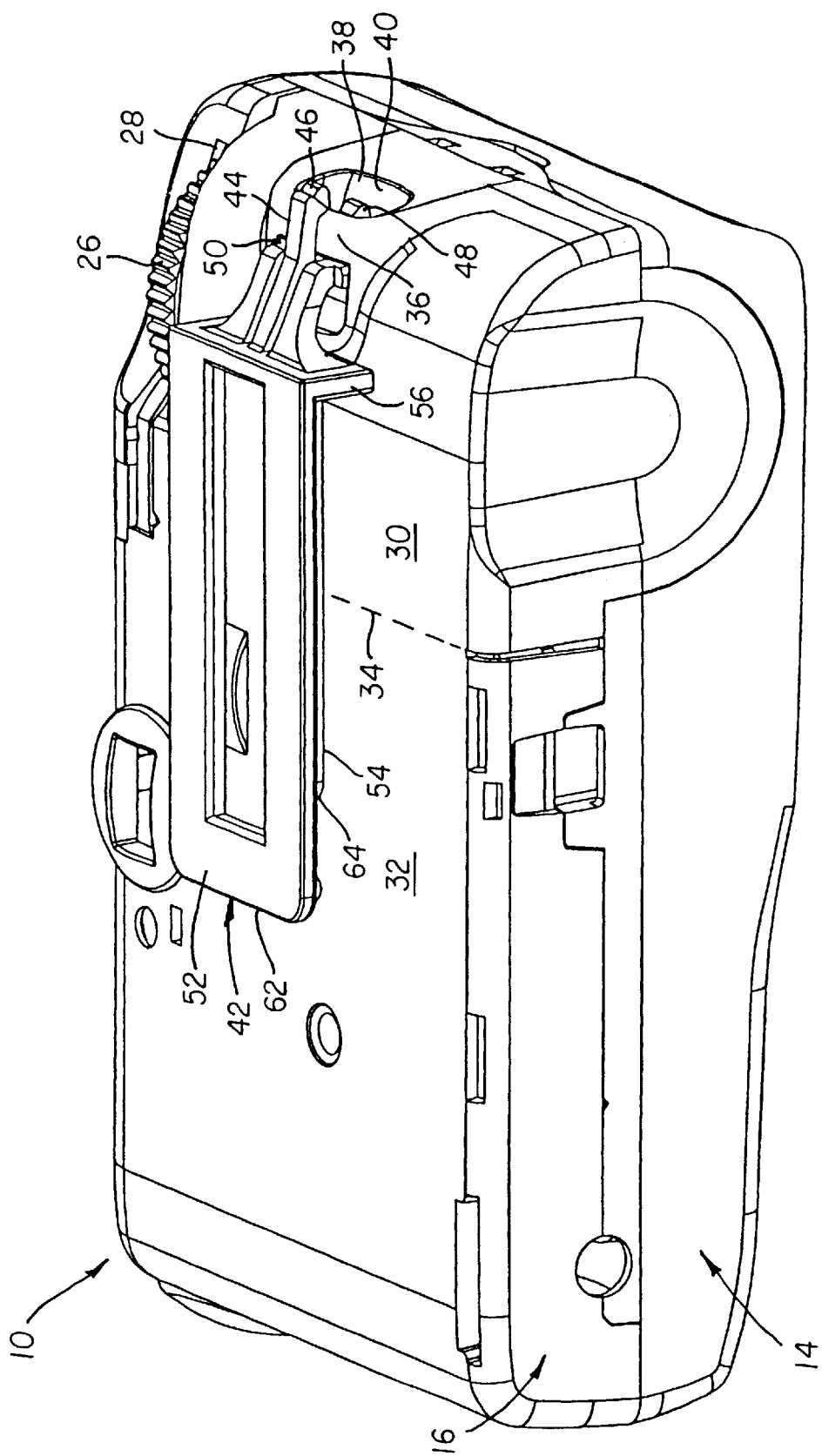
FIG. 1 is a rear perspective view of a one-time-use camera including an accessory belt clip attached to a door cover portion that can be pivoted open to remove a film cartridge from the camera.
Figure 2:
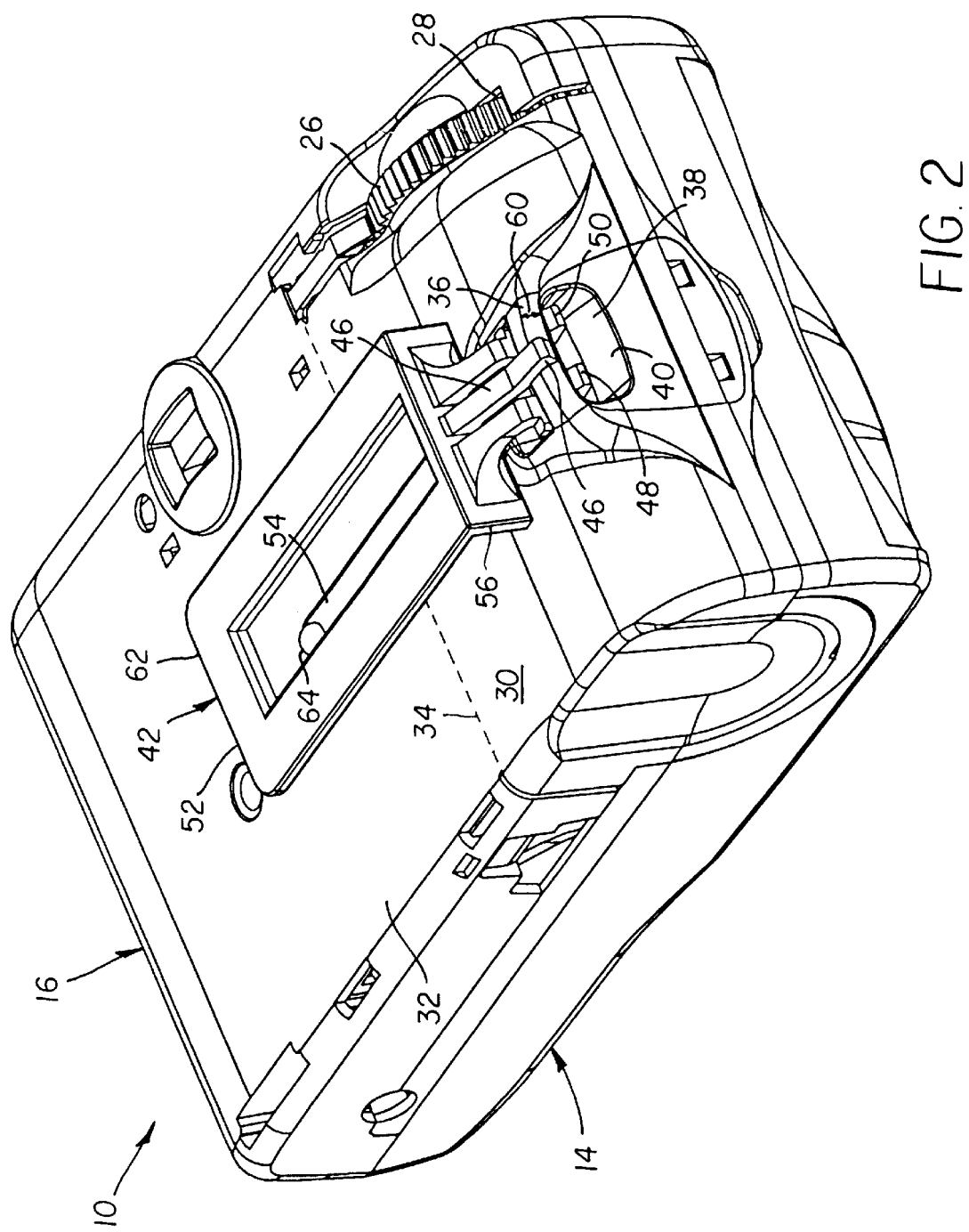
FIG. 2 is a rear perspective view of the camera as viewed from a different angle than in FIG. 1.
Figure 3:
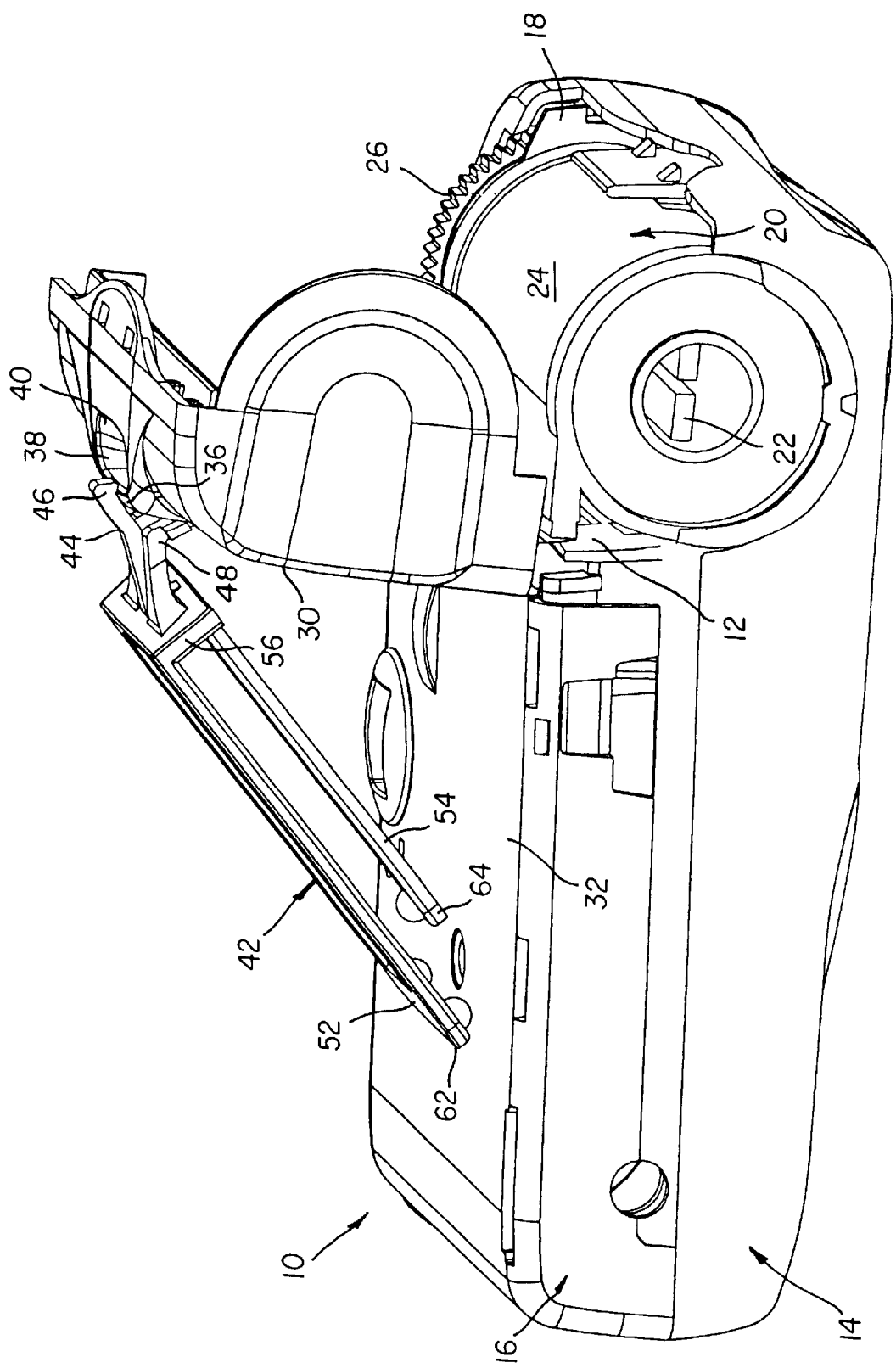
FIG. 3 is a rear perspective view of the camera showing the door cover pivoted open.

Referring now to the drawings, FIGS. 1–3 show a disposable one-time-use camera 10 including a plastic opaque interior main body part 12, a plastic opaque exterior front cover part 14, and a plastic opaque exterior rear cover part 16. The front cover part 14 and the rear cover part 16 house the main body part 12 between them and are connected releasably to one another and to the main body part 12 via known hook-in-hole connections.

As is typical, the main body part 12 has a rearwardly open cartridge receiving chamber 18 for a conventional film cartridge 20 and a rearwardly open film supply chamber (not shown) for an unexposed film roll (not shown) on a rotatable film supply spool (not shown). See FIG. 3. During assembly of the camera 10, an unexposed filmstrip (not shown) is substantially prewound from a rotatable film winding spool 22 in a cartridge shell 24 and into the unexposed film roll on the film supply spool. A rearwardly open backframe opening (not shown) is located between the cartridge receiving chamber and the film supply chamber for exposing successive frames of the filmstrip when ambient light is received through a front taking lens (not shown) on the main body part 12.

A rotatable film winding thumbwheel 26 coaxially engages the film winding spool 22 in the cartridge shell 24 and radially protrudes from an elongate narrow opening 28 in the rear cover part 16 in order to be manually grasped or fingered at its periphery to incrementally rotate the thumbwheel in a film winding direction, i.e. clockwise in FIGS. 1–3, to similarly rotate the film winding spool. This is done in order to wind an exposed frame of the filmstrip from the backframe opening into the film cartridge 20 after each film exposure, and to move a fresh frame of the filmstrip from the unexposed film roll to the backframe opening.

The rear cover part 16 has a smaller integral door cover portion 30 and a larger integral remaining cover portion 32 and is weakened on its inner side between the door and remaining cover portions as shown in the incorporated U.S. patent Ser. No. 6,097,890 issued Aug. 1, 2000. The weakness between the door and remaining cover portions 30 and 32 allows the door cover portion to be pivoted open relative to the remaining cover portion about a pivot axis 34 to permit the film cartridge 20 to be removed from the cartridge receiving chamber 18. The door cover portion 30 has integral end carrystrap post 36 and an end through-opening 38 beneath the carrystrap post which allow a conventional wrist carrystrap (not shown) to be looped through the through-opening and about the carrystrap post. The through-opening 38 is defined by the carrystrap post or rib 36 and an end concavity or recess 40 in the door cover portion 30.

Figure 4:
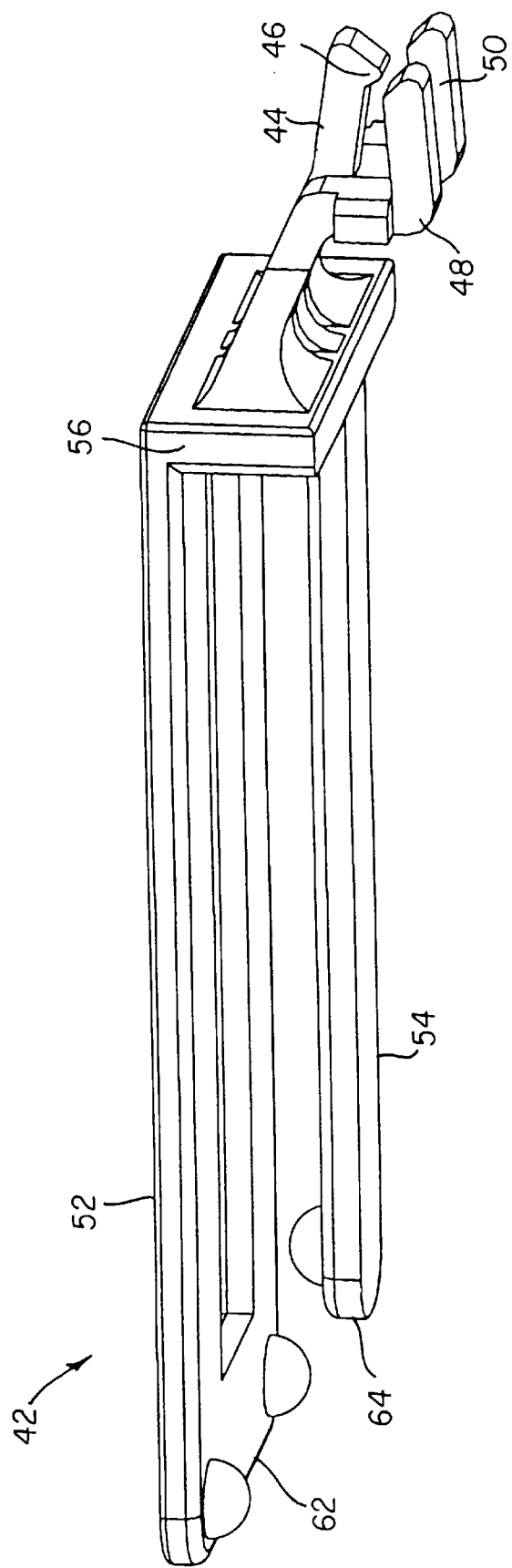
FIGS. 4, 5 and 6 are perspective views of the accessory belt clip in different orientations to facilitate its illustration.
Figure 5:
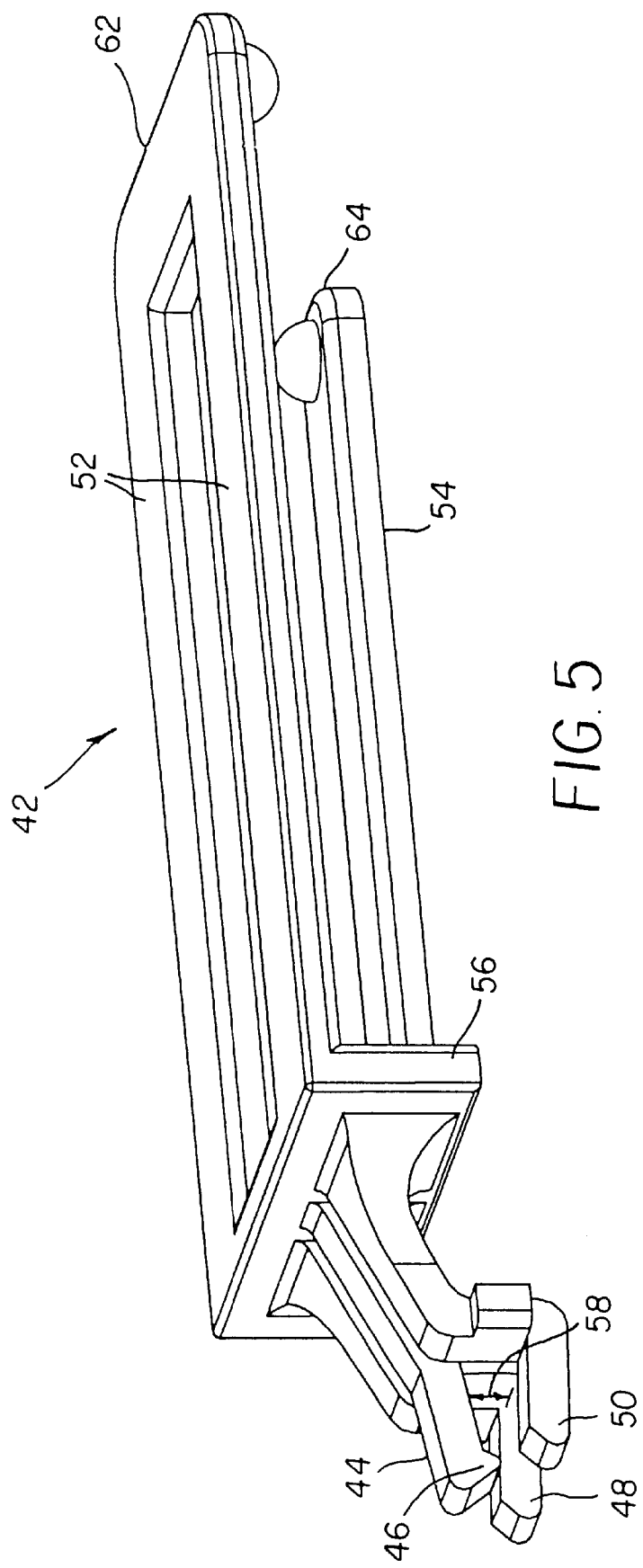
Figure 6:
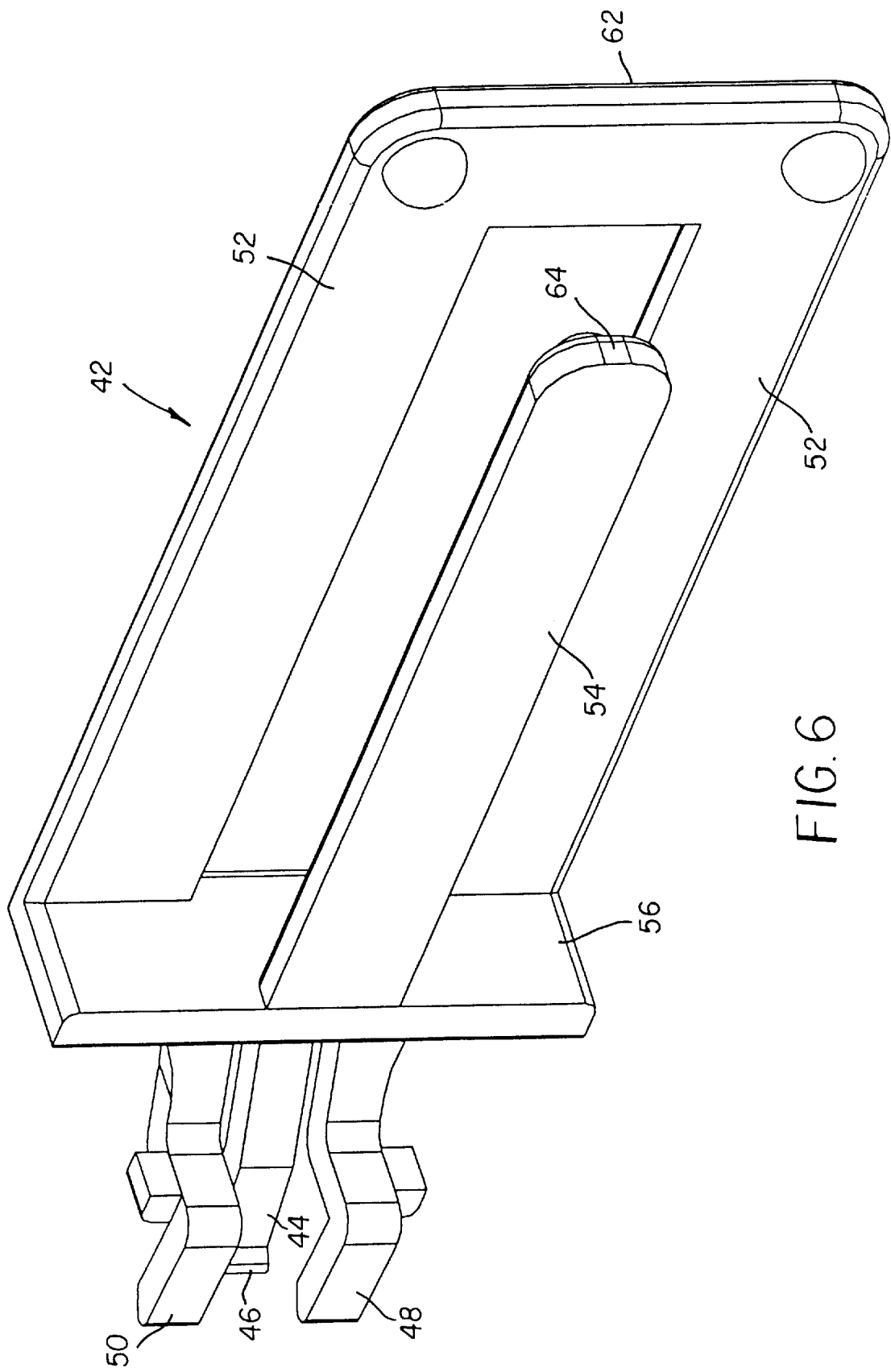

An accessory belt clip 42, shown in FIGS. 4-6, has a single outer resiliently-flexible finger 44 provided with an enlarged hook-like end 46, a pair of resiliently-flexible identical inner fingers 48 and 50, and a pair of resiliently-flexible outer and inner legs 52 and 54. The outer and inner legs 52 and 54 are parallel and spaced apart to receive one's belt (not shown) between them. An intermediate portion 56 of the accessory belt clip 42 separates the fingers 46, 48 and 50 from the legs 52 and 54. The fingers 46, 48 and 50 longitudinally extend substantially the same distance from the intermediate portion 56. In contrast, the outer leg 52 longitudinally extends farther from the intermediate portion 56 than the inner leg 54.

The outer finger 44 is spaced from the inner fingers 48 and 50 a distance 58 in FIG. 5 which is less than the thickness 60 in FIG. 2 of the carrystrap post 36. This, in combination with the resilience and flexibility of the outer and inner fingers 44 and 48, 50 allows the carrystrap post 36 to be received between the outer finger and the inner fingers to engage the carrystrap post as shown in FIGS. 1 and 2. The outer and inner fingers 44 and 48, 50 are flexed away from one another when the carrystrap post 36 is received between them, which allows the fingers to releasably grip the carrystrap post with the inner fingers longitudinally extending into the through-opening 38 and the outer finger longitudinally extending over the carrystrap post. The enlarged hook-like end 46 of the outer finger 44 serves to capture the carrystrap post 36 as shown in FIGS. 1 and 2. The inner leg 54 rests against the door and remaining cover portions 30 and 32 as shown in FIG. 1.

As shown in FIG. 3, when the door cover portion 30 is pivoted open, the carrystrap post 36 tends to rotate within the resilient flexible grip of the outer and inner fingers 4 and 48, 50 and simultaneously the outer and inner legs 52 and 54 slide at their respective ends 62 and 64 along the remaining cover portion 32 - - - which allows the inner fingers to begin to back out of the through-opening 38 (though without separating from the carrystrap loop 36). If this method of opening the camera 10 is followed, the accessory belt clip 42 will not be broken.

The invention has been described with reference to a preferred embodiment. However, it will be appreciated that variations and modifications can be effected by a person of ordinary skill in the art without departing from the scope of the invention. For example, instead of the pair of inner fingers 48 and 50 a single inner finger could be used.

PARTS LIST 10. one-time-use camera
12. main body part
14. front cover part
16. rear cover part
18. cartridge receiving chamber
20. film cartridge
22. film winding spool
24. cartridge shell
26. film winding thumbwheel
28. narrow opening
30. door cover portion
32. remaining cover portion
34. pivot axis
36. carrystrap post
38. through-opening
40. concavity or recess
42. accessory belt clip
44. outer finger
46. enlarged hook-like end
48. inner finger
50. inner finger 52. outer leg
54. inner leg
56. intermediate portion
58. distance
60. thickness
62. end
64. end

What is claimed is:

1. A one-time-use camera comprising:

a rear cover part that has an integral door cover portion and an integral remaining cover portion, that is weakened between said door and remaining cover portions to allow said door cover portion to be pivoted open relative to said remaining cover portion to permit a film cartridge to be removed from said camera, and that has a carrystrap post on said door cover portion; and an accessory belt clip that has a plurality of co-acting fingers which are spaced apart less than a thickness of said carrystrap post and are resiliently flexible away from one another to be able to engage said carrystrap post to releasably grip said carrystrap post, and that rests against said remaining cover portion when said co-acting fingers releasably grip said carrystrap post, in order that when said door cover portion is pivoted open said carrystrap post will rotate within the grip of said co-acting fingers and simultaneously said accessory belt clip will slide along said remaining cover portion to avoid breaking said accessory belt clip.

2. A one-time-use camera as recited in claim 1, wherein said accessory belt clip has legs that are spaced apart to receive one's belt between them and one of which rests against said remaining cover portion of said rear cover part when said co-acting fingers releasably grip said carrystrap post.

3. A one-time-use camera as recited in claim 2, wherein said accessory belt clip has an intermediate portion between said legs and said co-acting fingers, and said co-acting fingers project substantially the same distance from said intermediate portion.

4. A one-time-use camera as recited in claim 1, wherein one of said co-acting fingers has an enlarged hook-like end that captures said carrystrap post when said co-acting fingers releasably grip said carrystrap post.

5. A one-time-use camera comprising:

a rear cover part that has an integral door cover portion and an integral remaining cover portion, that is weakened between said door and remaining cover portions to allow said door cover portion to be pivoted open relative to said remaining cover portion to permit a film cartridge to be removed from said camera, and that has a carrystrap post on said door cover portion and a through-opening beneath said carrystrap post to allow a wrist carrystrap to be looped about said carrystrap post and an accessory belt clip that has an outer finger and an inner finger which are spaced apart less than a thickness of said carrystrap post and are resiliently flexible away from one another to be able to receive said carrystrap post between them and releasably grip said carrystrap post with said inner finger longitudinally extending into said through-opening and said outer finger longitudinally extending over said carrystrap post, and that has legs which are spaced apart to receive one's belt between them and one of which rests against said remaining cover portion of said rear cover part when said outer and inner fingers releasably grip said carrystrap post, in order that when said door cover portion is pivoted open said carrystrap post rib will rotate within the grip of said outer and inner fingers and simultaneously said leg that rests against said remaining cover portion will slide along said remaining cover portion to avoid breaking said accessory belt clip.

6. A method of opening a camera to remove a film cartridge from the camera, comprising:

pivoting a door cover portion of a rear cover part relative to a remaining cover portion of the rear cover part to swing the door cover portion open to permit the film cartridge to be removed; and rotating a carrystrap post, on the door cover portion, within an endgrip of an accessory belt clip, attached to the cover door portion at the carrystrap post, as the door cover portion is pivoted open, in order to avoid breaking the accessory belt clip.

7. A method as recited in claim 6, further comprising:

sliding an end portion of the accessory belt clip that is remote from the end-grip along the remaining cover portion as the door cover portion is pivoted open.

8. A method of opening a one-time-use camera to remove a film cartridge from the camera, comprising:

pivoting an integral door cover portion of a rear cover part relative to an integral remaining cover portion of the rear cover part to swing the door cover portion open to permit the film cartridge to be removed; and rotating a carrystrap post, on the door cover portion, within an elastic end-grip of an accessory belt clip, attached to the cover door portion at the carrystrap post and resting against the remaining cover portion, as the door cover portion is pivoted open, in order to avoid breaking the accessory belt clip.

9. A one-time-use camera comprising:

a rear cover part that has a door cover portion and a remaining cover portion, that is constructed to allow said door cover portion to be pivoted open relative to said remaining cover portion to permit a film cartridge to be removed from said camera, and that has a carrystrap post on said door cover portion; and an accessory belt clip that has means for gripping said carrystrap post in order that when said door cover portion is pivoted open said carrystrap post will rotate within the grip of said means and simultaneously said accessory belt clip will slide along said remaining cover portion to avoid breaking said accessory belt clip.

* * * * *